United States Patent
Hanson et al.

(10) Patent No.: US 10,872,317 B2
(45) Date of Patent: Dec. 22, 2020

(54) BIOMETRIC-BASED PUNCH-IN/PUNCH-OUT MANAGEMENT

(71) Applicant: About Time Technologies, LLC, Payson, UT (US)

(72) Inventors: Russell I. Hanson, Salem, UT (US); Ryan Remkes, Salem, UT (US); Michael T. Merrill, Salem, UT (US); Kory Tanner, Salem, UT (US)

(73) Assignee: About Time Technologies, LLC, Payson, UT (US)

( * ) Notice: Subject to any disclaimer, the term of this patent is extended or adjusted under 35 U.S.C. 154(b) by 259 days.

(21) Appl. No.: 16/170,624

(22) Filed: Oct. 25, 2018

(65) Prior Publication Data

US 2019/0122180 A1  Apr. 25, 2019

Related U.S. Application Data

(60) Provisional application No. 62/576,925, filed on Oct. 25, 2017.

(51) Int. Cl.

| | |
|---|---|
| *G06Q 10/10* | (2012.01) |
| *H04L 29/06* | (2006.01) |
| *G06N 3/08* | (2006.01) |
| *G06K 9/00* | (2006.01) |
| *G06K 9/62* | (2006.01) |
| *G06F 21/32* | (2013.01) |
| *G10L 17/00* | (2013.01) |

(52) U.S. Cl.
CPC ......... *G06Q 10/1091* (2013.01); *G06F 21/32* (2013.01); *G06K 9/00892* (2013.01); *G06K 9/00899* (2013.01); *G06K 9/6215* (2013.01); *G06N 3/08* (2013.01); *H04L 63/0861* (2013.01); *G06K 9/00006* (2013.01); *G06K 9/00597* (2013.01); *G10L 17/00* (2013.01)

(58) Field of Classification Search
None
See application file for complete search history.

(56) References Cited

U.S. PATENT DOCUMENTS

| | | | |
|---|---|---|---|
| 2002/0030584 A1* | 3/2002 | Perler | G07C 1/10 340/5.53 |
| 2002/0175211 A1* | 11/2002 | Dominquez | G07C 1/10 235/492 |
| 2015/0117724 A1* | 4/2015 | Thieme | G06K 9/6255 382/115 |

* cited by examiner

*Primary Examiner* — Paul Danneman
(74) *Attorney, Agent, or Firm* — Kunzler Bean & Adamson

(57) ABSTRACT

For managing a biometric punch-in system, a method captures training biometrics for a plurality of users. The method further trains a biometric algorithm with the training biometrics. The method presents a threshold user interface to an administrator that compares one or more identification biometrics that do not satisfy a match threshold for the plurality of users and a match threshold control for adjusting the match threshold. The method further adjusts the match threshold in response to the match threshold control. The method determines a match level for the identification biometric based on the biometric algorithm. In response to the match level not satisfying the match threshold, the method presents an attendance user interface including punch-in/punch-out times, corresponding identification biometrics and match levels, and attendance information for the first user, wherein suspect identification biometrics are highlighted.

20 Claims, 13 Drawing Sheets

200

| 201 | 203 | 205 | 207 | 209 | 211 | 213 | 215 | 217 |
|---|---|---|---|---|---|---|---|---|
| ☐ | Tags | First | Last | Device | Job | Task | Task Code | Access Code |
| ☐ | ✏ 🌀 | John | Doe |  | XYZ |  |  |  |
| ☑ | 📱 📄 🌐 👤 | John | Doe | ~~John iPhone~~ | Workmax | Gen | 4000GL |  |
| ☐ | 🌐 👤 🕐 | John | Doe | ~~John iPhone~~ | Workmax | Estim | 6000ES |  |
| ☐ | 📱 🌐 ✒ | John | Doe | ~~John iPhone~~ | Workmax | HVAC | 5000 | 1002,1003, 1001 |
| ☐ | 🚩 📱 🌐 💼 | John | Doe | Ryan iPhone | ABC | Excav | 1000 |  |
| ☐ | 💻 🌐 ⊙ | Sam | Moe | ~~Ryan Remkes~~ | Remodel | Frame | 4000 | 1002,1003, 1001 |

| 219 | 221 | 223 | 225 | 227 | 229 | 231a | 231b | 233 | 235 | 237 |
|---|---|---|---|---|---|---|---|---|---|---|
| In | Out | Total | Units | Emp | Mgr | SO1 | SO2 | Div | Dept | ML |
| 8/22 8:04 | 8/22 11:05 | 3:01 |  |  |  |  |  |  |  | 92 |
| 8/29 15:38 | 8/29 17:41 | 2:03 |  |  |  |  |  |  |  | 89 |
| 9/5 10:57 | 9/5 15:02 | 4:05 |  | ✓ | ✓ |  |  |  |  | 95 |
| 9/5 11:14 | 9/5 11:16 | 3:01 | 85.00 | ✓ | ✓ |  |  |  |  | 93 |
| 9/20 12:41 |  | 0:00 |  |  | ✓ |  |  |  |  | 67 |
| 8/18 11:49 | 8/18 13:51 | 2:02 |  |  |  |  |  |  |  | 91 |

Identification Biometric
301

Identification Biometric Location
295

Clothing Parameter
305

Eye Wear Parameter
307

Facial Hair Parameter
309

Make Up Parameter
311

Lighting Parameter
313

Match Level
321

Match Threshold
323

Training Biometric
331

Biometric Algorithm
333

BIOMETRIC-BASED PUNCH-IN/PUNCH-OUT MANAGEMENT

FIELD

This application claims priority to U.S. Provisional Patent Application No. 62/576,925 entitled "BIOMETRIC-BASED PUNCH IN/PUNCH OUT" and filed on Oct. 25, 2017 for Russell L. Hanson, which is incorporated herein by reference.

FIELD

The subject matter disclosed herein relates to biometric-based punch-in/punch-out management.

BACKGROUND

Description of the Related Art

Employees regularly punch-in and punch-out at work.

BRIEF SUMMARY

A method for managing a biometric punch-in system is disclosed. The method captures, by use of a processor, training biometrics for a plurality of users. The method further trains a biometric algorithm with the training biometrics. The method presents a threshold user interface to an administrator that compares one or more identification biometrics that do not satisfy a match threshold for the plurality of users and a match threshold control for adjusting the match threshold. The method further adjusts the match threshold in response to the match threshold control. The method determines a match level for the identification biometric based on the biometric algorithm. In response to the match level not satisfying the match threshold, the method presents an attendance user interface comprising punch-in/punch-out times, corresponding identification biometrics and match levels, and attendance information for the first user, wherein suspect identification biometrics are highlighted. An apparatus and program product also perform the functions of the method.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 2A is a drawing illustrating one embodiment of an attendance user interface;

FIG. 3 is a schematic block diagram illustrating one embodiment of system data;

DETAILED DESCRIPTION

Figure 1:
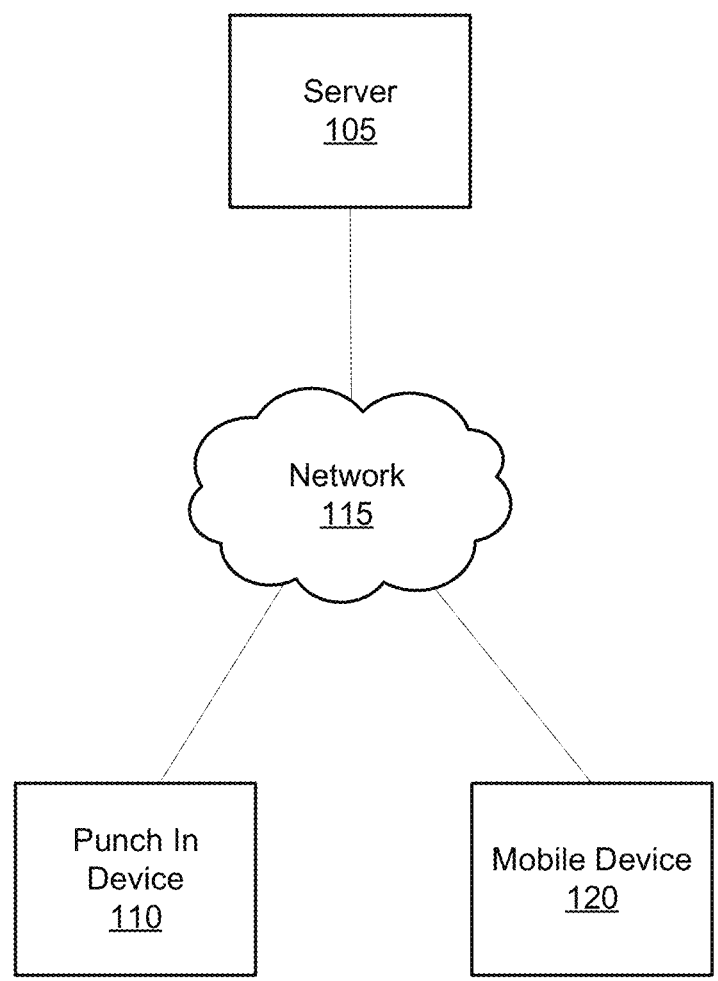
FIG. 1 is a schematic block diagram illustrating one embodiment of a biometric punch-in system.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 is a schematic block diagram illustrating one embodiment of a biometric punch-in system 100. The system 100 uses a biometric to validate an employee during a punch-in or punch-out operation. In the depicted embodiment, the system 100 includes a server 105, a network 115, a punch-in device 110, and a mobile device 120. The punch-in device 110 may be a computer, a dedicated kiosk, and the like. The punch-in device 110 may include a camera, a microphone, and/or a scanner. The mobile device 120 may be a mobile telephone, a tablet computer, a laptop computer, or the like. The mobile device 120 may include a camera and/or a microphone. The network 115 may be the Internet, a mobile telephone network, a Wi-Fi network, a local area network, a wide-area network, or combinations thereof.

The server 105 may store identification biometrics and a biometric algorithm for a plurality of employees. The punch-in device 110 and/or mobile device 120 may capture an identification biometric from an employee during a punch-in and/or punch-out operation. The identification biometric may comprise one or more of an image, a voice print, a retina scan, and a fingerprint. The system 100 may use the biometric to validate the identity of each employee that punches in and punches out.

In one embodiment, the system 100 determines a match level for the identification biometric based on the biometric algorithm. The biometric algorithm may be selected from the group consisting of a statistical algorithm, a recursive neural network, a convolutional neural network, and a long short term memory (LSTM) network. The system 100 may further compare the match level to a match threshold. If the match level satisfies the match threshold, the system 100 validates the identification biometric.

Unfortunately, setting the match threshold can be difficult for administrators. If the match threshold is set too low, few employees will not be invalidated. However, employees may more easily punch in and/or punch out for a colleague, or otherwise fraudulently use the system 100, with the system 100 generating a false positive validation. As a result, the system 100 is more susceptible to fraud.

However, if the match threshold is set too high, many punch-in/punch-out attempts will result in false invalidations. False invalidations must be corrected, generating a costly administrative burden. In the past, administrators have typically arbitrarily set the match threshold and then over time adjusted to the match threshold to correct persistent problems. This arbitrary process of setting the match threshold results in significant costs either in fraud and/or administrative overhead until a proper match threshold is arrived at.

The embodiments present a threshold user interface that allows the administrator to easily and rapidly adjust the match threshold as will be described hereafter. As a result, the match threshold may be rapidly calibrated to minimize false positives and false negatives.

Even with an optimally calibrated match threshold, false invalidations may occur. Even if only a tiny percentage of false invalidations occur, investigating and resolving each faults invalidation is costly for large organizations. The embodiments present an attendance user interface that allows an administrator to quickly and efficiently resolve faults invalidations.

In addition, employees may still attempt to fraudulently punch-in and/or punch-out. The attendance user interface may be further used to efficiently identify, investigate, and resolve fraudulent punch-in/punch-out attempts as will be described hereafter.

FIG. 2A is a drawing illustrating one embodiment of an attendance user interface 200. The attendance user interface 200 may be presented to the administrator on a screen. In the depicted embodiment, attendance information is presented in tabular form, with the selection column 201, a tag column 203, a first name column 205, a last name column 207, a device column 209, a job column 211, a task column 213, a task code column 215, an access code column 217, an in time column 219, an out time column 221, a total time column 223, a units column 225, an employee verification column 227, a manager verification column 229, one or more defined columns 231, a division column 233, a department column 235, and a match level column. Each row represents a record of a pair of punch-in/punch-out events. The tags of the tag column 203, device column 209, job column 211, task column 213, task code column 215, access code column 217, total time column 223, units column 225, employee verification column 227, manager verification column 229, defined columns 231, division column 233, and department column 235 may comprise attendance information.

The selection column 201 may allow one or more rows to be selected. The tag column 203 may present one or more tags to the administrator. Each tag may be presented in response to specific criteria being satisfied. The criteria may include the occurrence of an event, an algorithm exceeding a threshold, a plurality of specified events occurring, and a sequence of events occurring. The tags rapidly and efficiently communicate the status of each punch-in/punch-out to the administrator, allowing the administrator to rapidly resolve invalid punch-in/punch-out events. In addition, the tags allow the administrator to efficiently identify and resolve suspect punch-in/punch-out events. The tags are described in more detail in FIG. 2B.

The first name column 205 displays an employee first name. The last name column 207 displays an employee last name. The device column 209 identifies a punch-in device selected from the punch-in device 110 and/or mobile device 120 used to punch-in/punch-out. The job column 211 displays a job name of a job. The task column 213 displays a task label for the job. The task code column 215 displays a task code for the job. The access code column 217 displays an access code for the job. The in time column 219 presents the punch-in time. The out time column 221 displays the punch-out time. The total time column 223 displays a total time elapsed between punch-in and punch-out. The units column 225 display work units for the job. An employee verification column 227 displays an employee confirmation of the punch-in/punch-out record. The manager verification column 229 displays a manager confirmation of the punch-in/punch-out record. The defined columns 231 display defined parameters. The division column 233 displays an organizational division name. The department column 235 displays an organizational department name.

The match level column 237 may present a match level. The match level may be an average match level for the punch-in and punch-out, a lowest match level, or both the punch-in match level and the punch-out match level.

The punch-in/punch-out times, the corresponding match levels, the attendance information, an identification biometric location relative to a geofence, a time discrepancy, a manual override, a punch-in device, and tangible assets may be searchable in the attendance user interface 200.

The administrator may sort the records based on values for one or more columns. In one embodiment, rows with specified tag values and/or attendance information are displayed automatically.

Figure 2B:
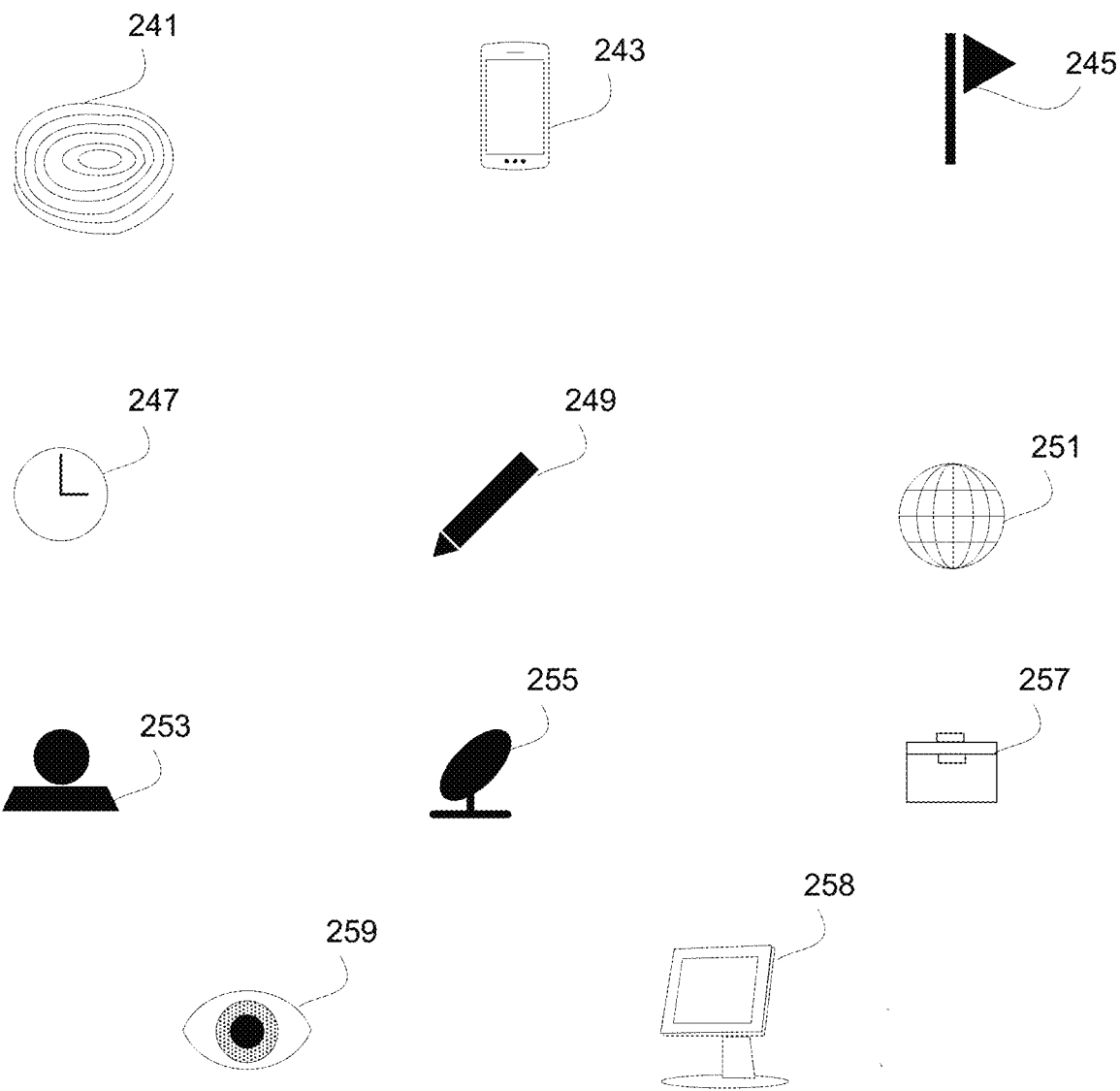
FIG. 2B includes drawings of one embodiment of attendance user interface tags.

FIG. 2B includes drawings of one embodiment of attendance user interface tags. The tags include a fingerprint tag 241, a mobile device tags 243, an incomplete record tag 245, a time discrepancy tag 247, a manual override tag 249, a location tag 251, an image recognition tag 253, a voice print recognition tag 255, an assets tag 257, a retinal recognition tag 259, and a punch-in device tag 258.

The mobile device tag 243 indicates that the mobile device 120 was used to capture the identification biometric. The incomplete record tag 245 indicates that a punch-in/punch-out record is incomplete. The manual override tag 249 indicates that a manager and/or administrator has overridden a validation/invalidation for punch-in/punch-out record. The assets tag 257 indicates that physical assets are being used for a job. In one embodiment, the assets tag 257 is displayed if the value of physical assets exceeds an asset threshold. The punch-in device tag 258 indicates that the punch-in device 115 was used to capture the identification biometric.

The fingerprint tag 241 is displayed in response to capturing a fingerprint identification biometric in a punch-in/punch-out operation. The fingerprint tag 241 may be highlighted to indicate an invalid match level and/or a suspect match level. The suspect match level may be identified if the match level is within a specified suspect range of the match threshold. In one embodiment, the suspect match level is identified in response to detecting an inorganic fingerprint. In addition, the suspect match level may be identified in response to conductive properties of the fingerprint falling outside a conduction range. Selecting the fingerprint tag 241 may display fingerprint information including an organic estimate and/or a conductivity measurement.

The time discrepancy tag 247 is displayed in response to detecting a time discrepancy between a time reported by the mobile device 120 and a corresponding time recorded by the server 105. In one embodiment, the time discrepancy tag 247 is displayed if the time discrepancy is greater than five minutes. Selecting the time discrepancy tag 247 may display the time discrepancy.

The location tag 251 is displayed in response to receiving an identification biometric location. In addition, the location tag 251 may be highlighted in response to determining that the identification biometric location is outside of a geofence. Selecting the location tag 251 may display location information. The location information is described hereafter in FIG. 2E.

The image recognition tag 253 is displayed in response to capturing an image identification biometric. The image recognition tag 253 may be highlighted to indicate an invalid match level and/or a suspect match level. In one embodiment, a suspect match level is identified if the match level is within the specified suspect range of the match threshold. In addition, the suspect match level may be identified if a parameter of the match threshold exceeds a parameter bound, even if the match level satisfies the match threshold.

The voice print recognition tag 255 is displayed in response to capturing a voice print identification biometric. The voice print recognition tag 255 may be highlighted to indicate an invalid match level and/or a suspect match level. In one embodiment, a suspect match level is identified if the match level is within the specified suspect range of the match threshold.

The retinal recognition tag 259 is displayed in response to capturing a retinal scan identification biometric. The retinal recognition tag 259 may be highlighted to indicate an invalid match level and/or a suspect match level. In one embodiment, a suspect match level is satisfied if the match level is within the specified suspect range of the match threshold.

Figure 2C:
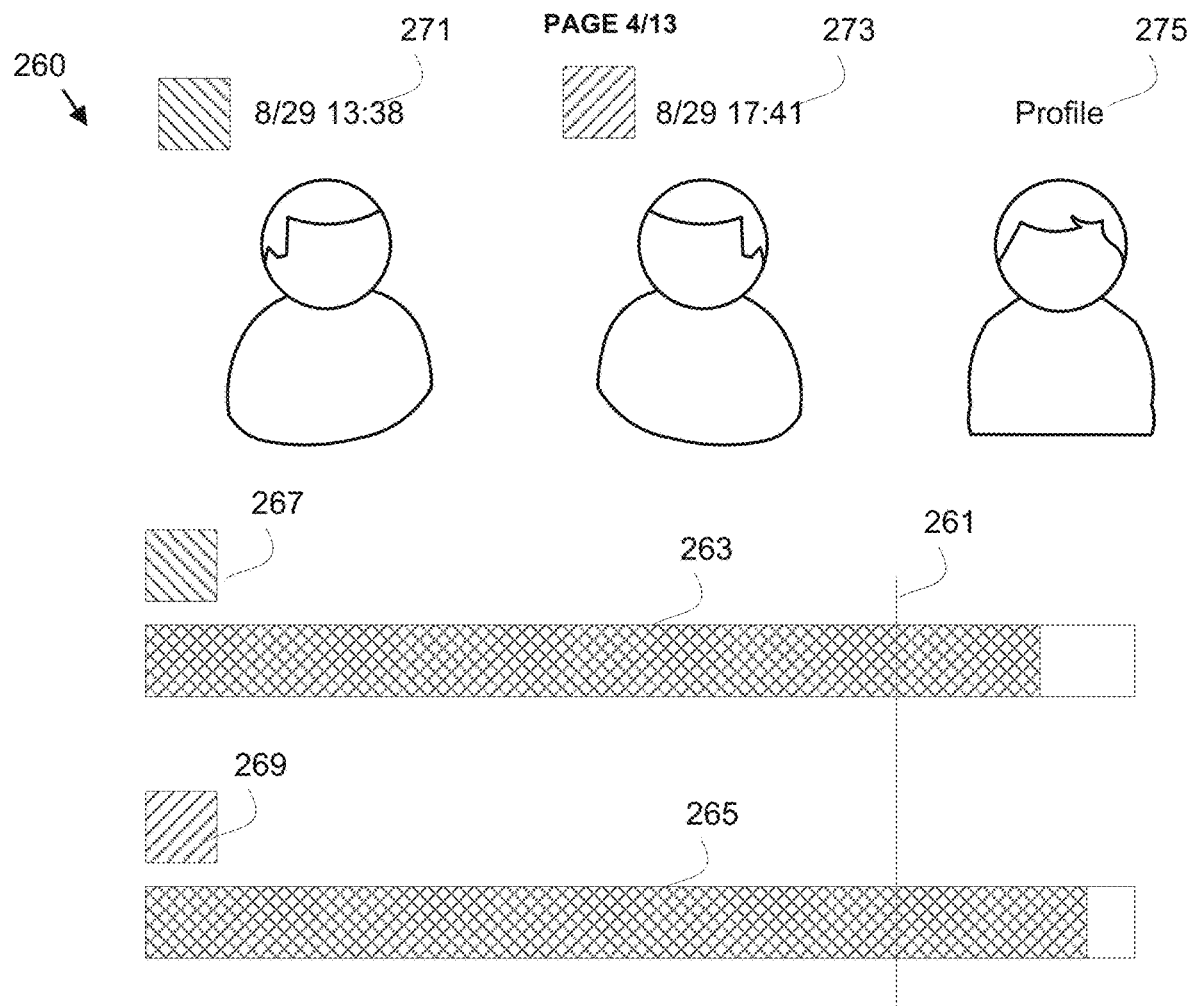
FIG. 2C is a drawing illustrating one embodiment of a threshold user interface.

FIG. 2C is a drawing illustrating one embodiment of a threshold user interface 260. The threshold user interface 260 allows the administrator to efficiently and rapidly adjust the match threshold. The threshold user interface 260 may be presented to the administrator on a screen. In the depicted embodiment, the threshold user interface 260 includes punch-in information 271, punch-out information 273, a training biometric 275, a punch-in indicator 267, a punch-in match level 263, a punch-out indicator 269, a punch-out match level 265, and a match threshold control 261.

In the depicted embodiment, the punch-in information 271 and punch-out information 273 each includes an identification biometric for a given user. In the depicted embodiment, the identification biometric is an image. In addition, the identification biometric may include a voice print, a retina scan, and/or fingerprint. The punch-in information 271 and punch-out information 273 may further include a timestamp. In one embodiment, the one or more identification biometrics do not satisfy the match threshold for the given user. The punch-in information 271 and punch-out information 273 may be used to adjust the match threshold.

The training biometric 275 may include an biometric such as an image. In addition, the training biometric 275 may include a voice print, a retina scan, and/or a fingerprint. A label may identify the training biometric 275.

The punch-in match level 263 indicates the match level for the punch-in information 271. The punch-out match level 265 indicates the match level for the punch-out information 273. The administrator may adjust the match threshold control 261 so that the displayed punch-in information 271 and punch-out information 273 either satisfy or do not satisfy the match threshold.

In one embodiment, the threshold user interface 260 may display the punch-in information 271 and the punch-out information 273 for a plurality of users in succession. The administrator may adjust the match threshold control 261 and match threshold for the plurality of users to rapidly arrive at a desired match threshold. As a result, the setting of the match threshold is enhanced. In one embodiment, a separate match threshold may be set for each of the punch-in match level 263 and the punch-out match level 265.

Figure 2D:
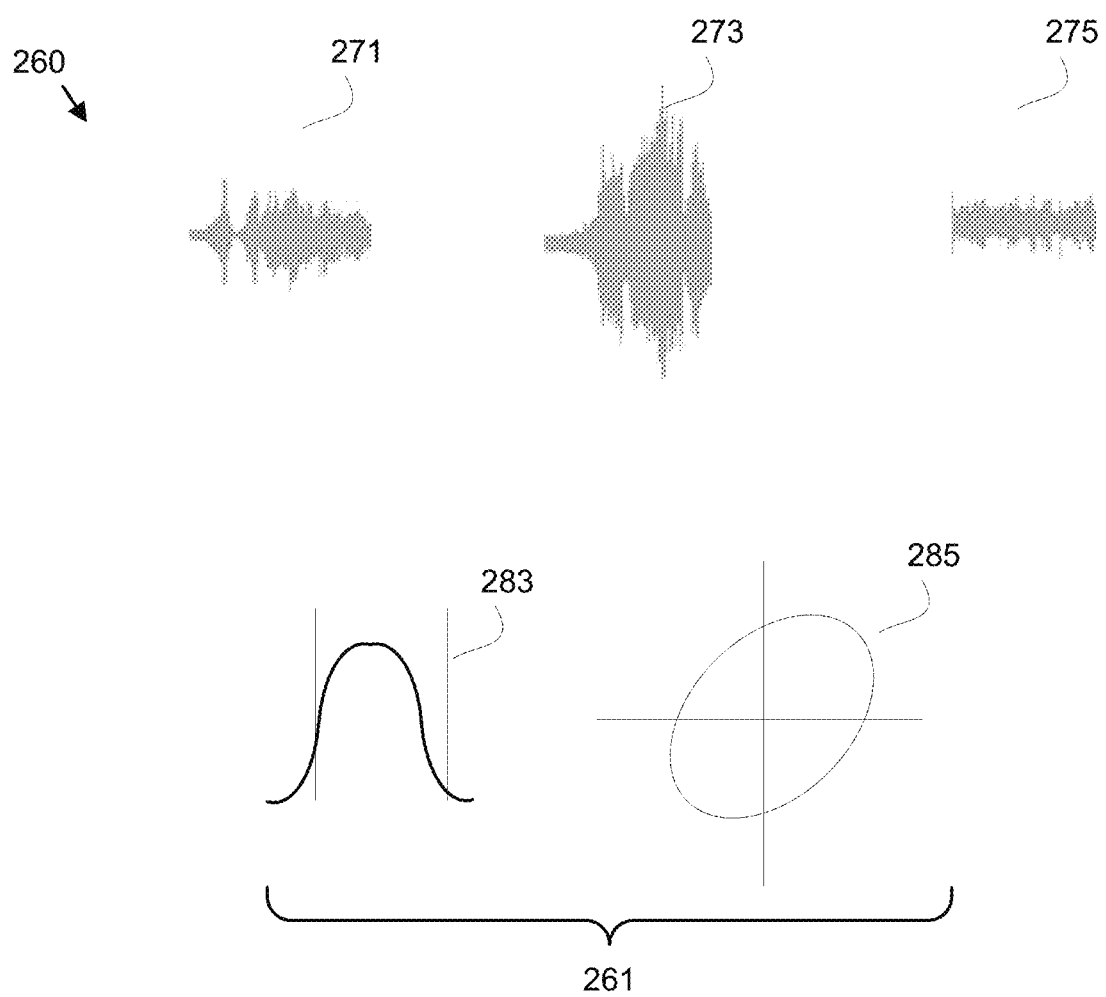
FIG. 2D is a drawing illustrating one embodiment of a multi-parameter threshold user interface.

FIG. 2D is a drawing illustrating one embodiment of a multi-parameter threshold user interface 260. The threshold user interface 260 may be presented to an administrator on the screen. As in FIG. 2C, punch-in information 271, punch-out information 273, and a training biometric 275 are displayed. In the depicted embodiment, the biometrics are voice prints. In addition, alternative match threshold controls 261 are displayed. The alternative match threshold controls 261 may include a distribution control 283 and a multiple parameter control 285.

The distribution control 283 allows the administrator to set the match threshold to satisfy desired standard deviations of punch-in information 271 and punch-out information 273. The multiple parameter control 285 allows the administrator to concurrently adjust parameters for the match threshold, wherein each parameter is adjusted along a separate axis of a grid.

Figure 2E:
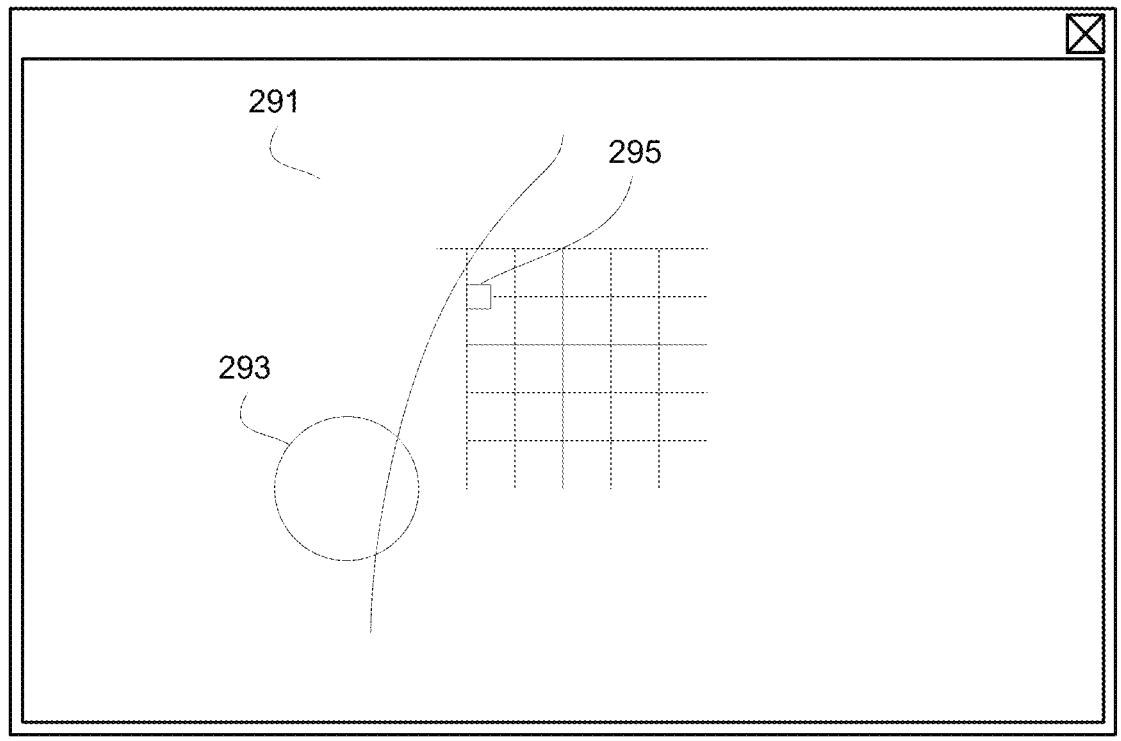
FIG. 2E is a drawing illustrating one embodiment of location information.

FIG. 2E is a drawing illustrating one embodiment of the location information 291. The location information 291 may be presented on a screen. In the depicted embodiment, the location information 291 includes a geo-fence 293 displayed on a map. The geo-fence 293 encloses valid locations for a punch-in and/or punch-out operation. In addition, the location information 291 includes an identification biometric location 295 displayed on the map. The identification biometric location 295 indicates where the punch-in and/or punch-out operation was performed. In the depicted embodiment, the identification biometric location 295 is outside of the geo-fence 293.

FIG. 3 is a schematic block diagram illustrating one embodiment of system data 300. The system data 300 may be organized as a data structure in a memory. In the depicted embodiment, the system data 300 includes the identification biometric 301, the identification biometric location 295, the match level 321, the match threshold 323, the training biometric 331, and the biometric algorithm 333. In addition, the system data 300 may include a clothing parameter 305, an eye wear parameter 307, a facial hair parameter 309, a makeup parameter 311, and a lighting parameter 313.

The clothing parameter 305 may characterize a range of clothing including clothing that is likely and/or unlikely to be appropriate during the punch-in and/or punch-out operation. The eye wear parameter 307 may characterize a range of eyewear that is unacceptable for the punch-in/punch-out operation. For example, dark glasses may be unacceptable.

The facial hair parameter 309 may characterize a range of facial hair levels that may be compared against recent identification biometrics 301. For example, an employee may go from significant facial hair to know facial hair between two punch-in operations. However, the facial hair parameter 309 may indicate a level of facial hair growth between two punch-in operations that is suspect.

The makeup parameter 311 may characterize a range of makeup configurations for the identification biometric 301 that may be suspect. For example, makeup that significantly alters the appearance of the nose or mouth may be suspect. The lighting parameter 313 may characterize a range of lighting configurations for the identification biometric 301 that may be suspect. For example, lighting that significantly obscures facial characteristics may be suspect.

Figure 4A:
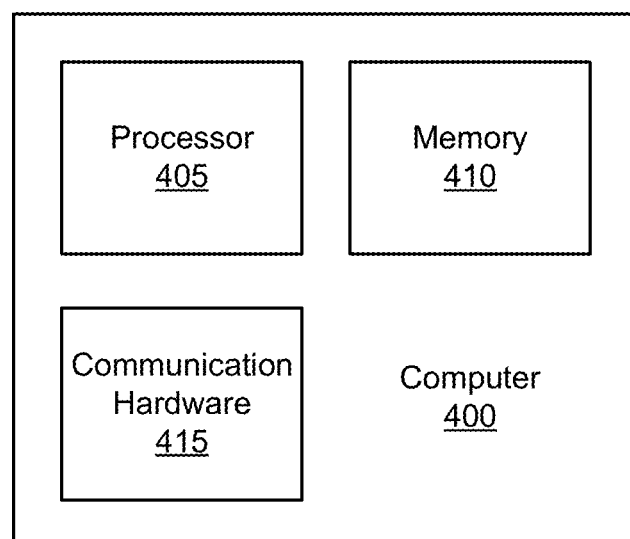
FIG. 4A is a schematic block diagram illustrating one embodiment of a computer.

FIG. 4A is a schematic block diagram illustrating one embodiment of a computer 400. The computer 400 may be embodied in the server 105, the punch-in device 110, and/or the mobile device 120. In the depicted embodiment, the computer 400 includes a processor 405, a memory 410, and communication hardware 415. The memory 410 may include a semiconductor storage device, hard disk drive, an optical storage device, or combinations thereof. The memory 410 may store code. The processor 405 may execute the code. The communication hardware 415 may communicate with other devices such as the network 115.

Figure 4B:
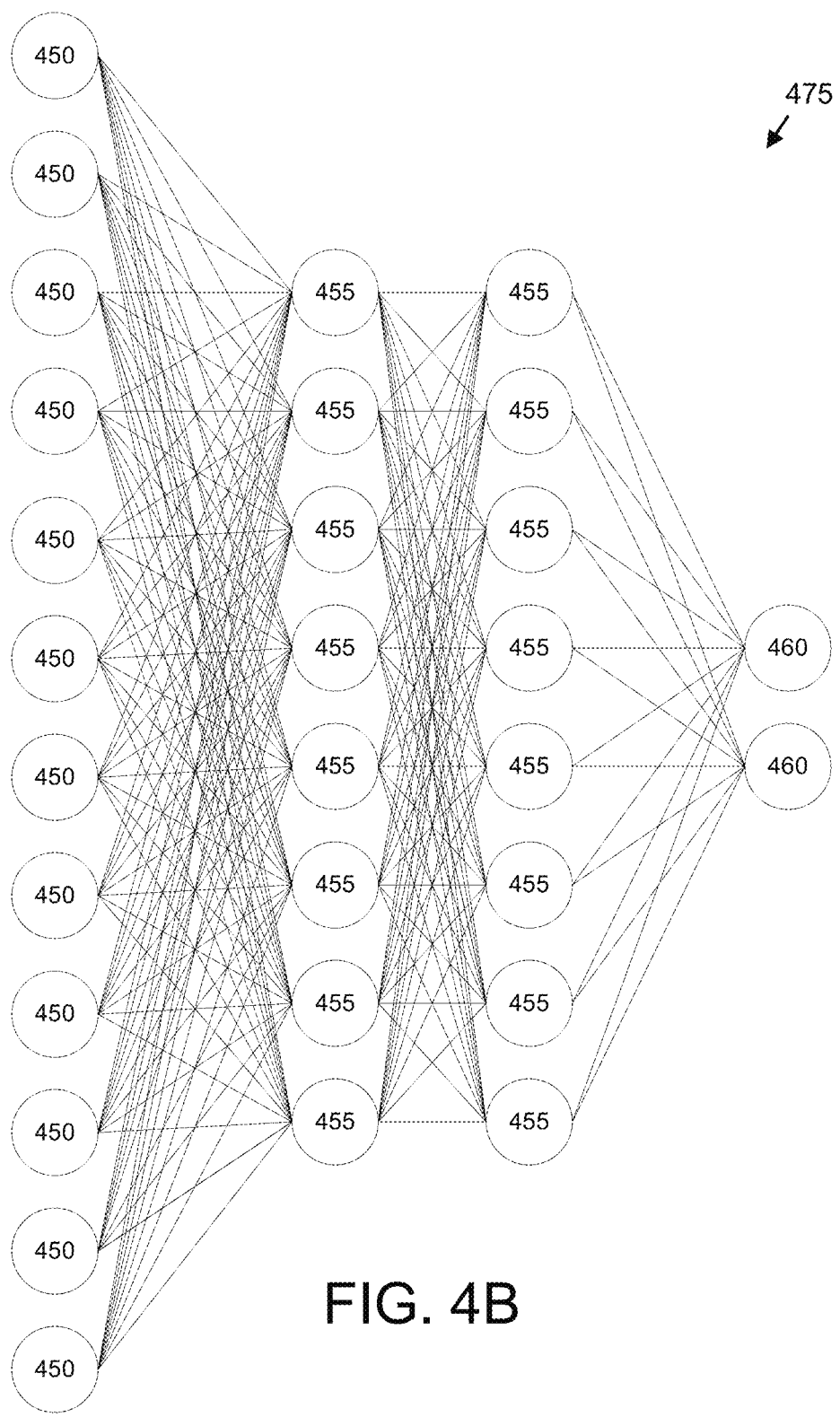
FIG. 4B is a schematic block diagram illustrating one embodiment of a neural network.

FIG. 4B is a schematic block diagram illustrating one embodiment of a neural network 475. The neural network 475 may implement a portion of the biometric algorithm 333. In the depicted embodiment, the neural network 475 implements a convolutional neural network. In addition, multiple neural networks 475 maybe organized to implement a recursive neural network and/or an LSTM neural network. The neural network 475 includes input neurons 450, hidden neurons 455, and output neurons 460. The neural network 475 may be trained with the training biometrics 331. In one embodiment, each training biometric 331 may be marked as one of valid and invalid.

The trained neural network 475 may further receive an identification biometric 301 from a punch-in operation and/or punch-out operation. The neural network 475 may determine a match level 321 for the identification biometric 301 based on the biometric algorithm 333.

Figure 5A:
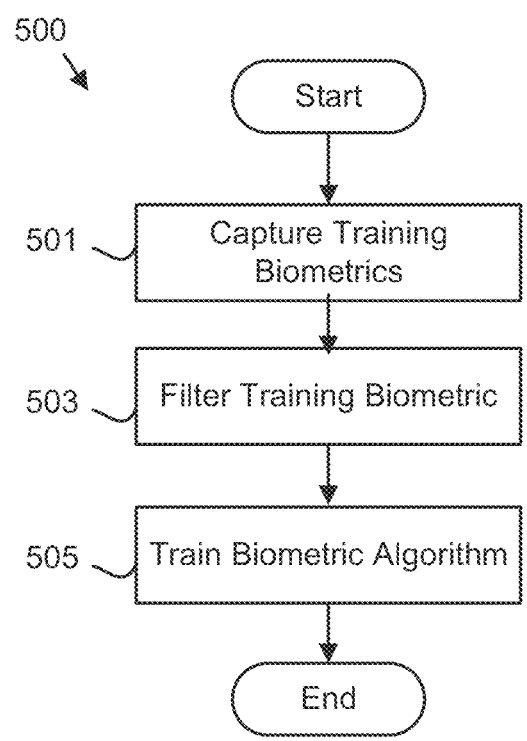
FIG. 5A is a schematic flow chart diagram illustrating one embodiment of a training method.

FIG. 5A is a schematic flow chart diagram illustrating one embodiment of a training method 500. The method 500 may train the biometric algorithm 333. The method 500 may be performed by the processor 405 and/or neural network 475.

The method 500 starts, and in one embodiment, the processor 405 captures 501 training biometrics 331 for a plurality of users. The processor 405 may employ one or more of the punch-in device 110 and/or the mobile device 120 to capture 501 the training biometrics 331.

The processor 405 may further filter 503 the training biometrics 331. The training biometrics 331 may be filtered by one or more of the punch-in/punch-out times, the corresponding match levels, the attendance information, the identification biometric location relative 295 to a geofence 293, a time discrepancy, a manual override, a punch-in device, and tangible assets. In one embodiment, the training biometrics 331 are filtered based on parameters such as the clothing parameter 305, eye wear parameter 307, facial hair parameter 309, makeup parameter 311, and lighting parameter 313. In a certain embodiment, training biometrics 331 that do not satisfy the parameters are not used to train the biometric algorithm 333. In an alternative embodiment, training biometrics 331 that do not satisfy the parameters may be used as invalid cases to train the biometric algorithm 333.

The processor 405 may train 505 the biometric algorithm 333 and the method 500 ends. The biometric algorithm 333 may be trained by performing a regression on the training biometrics 331. In addition, the biometric algorithm 333 may be trained by training the neural network 475 with the training biometrics 331.

Figure 5B:
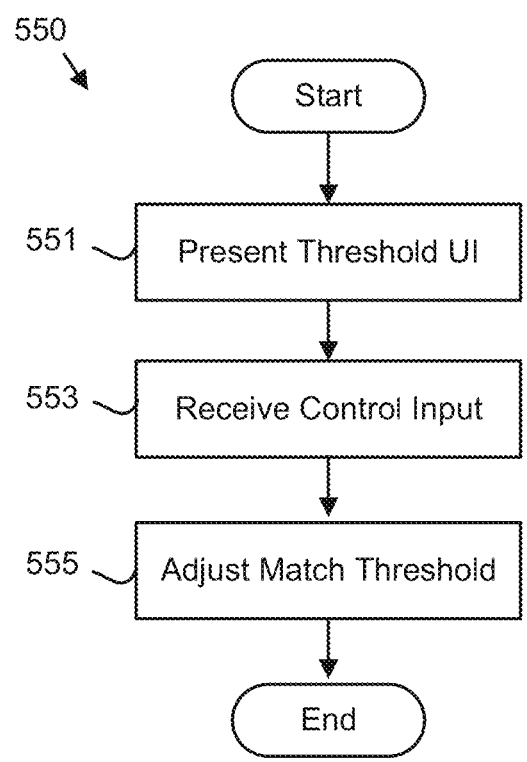
FIG. 5B is a schematic flow chart diagram illustrating one embodiment of a match threshold adjustment method.

FIG. 5B is a schematic flow chart diagram illustrating one embodiment of a match threshold adjustment method 550. The method 550 may adjust the match threshold 323. The method 550 may be performed by the processor 405.

The method 550 starts, and in one embodiment, the processor 405 presents 551 the threshold user interface 260. The threshold user interface 260 may include punch-in information 271 and/or punch-out information 273 with identification biometrics 301 that do not satisfy the match threshold 323. The threshold user interface 260 further presents 551 the match threshold control 261.

The processor 405 receives 553 a control input from the match threshold control 261 that specifies the match threshold 323. The processor 405 further adjusts 551 the match threshold 323 in response to the control input and the method 550 ends.

Figure 5C:
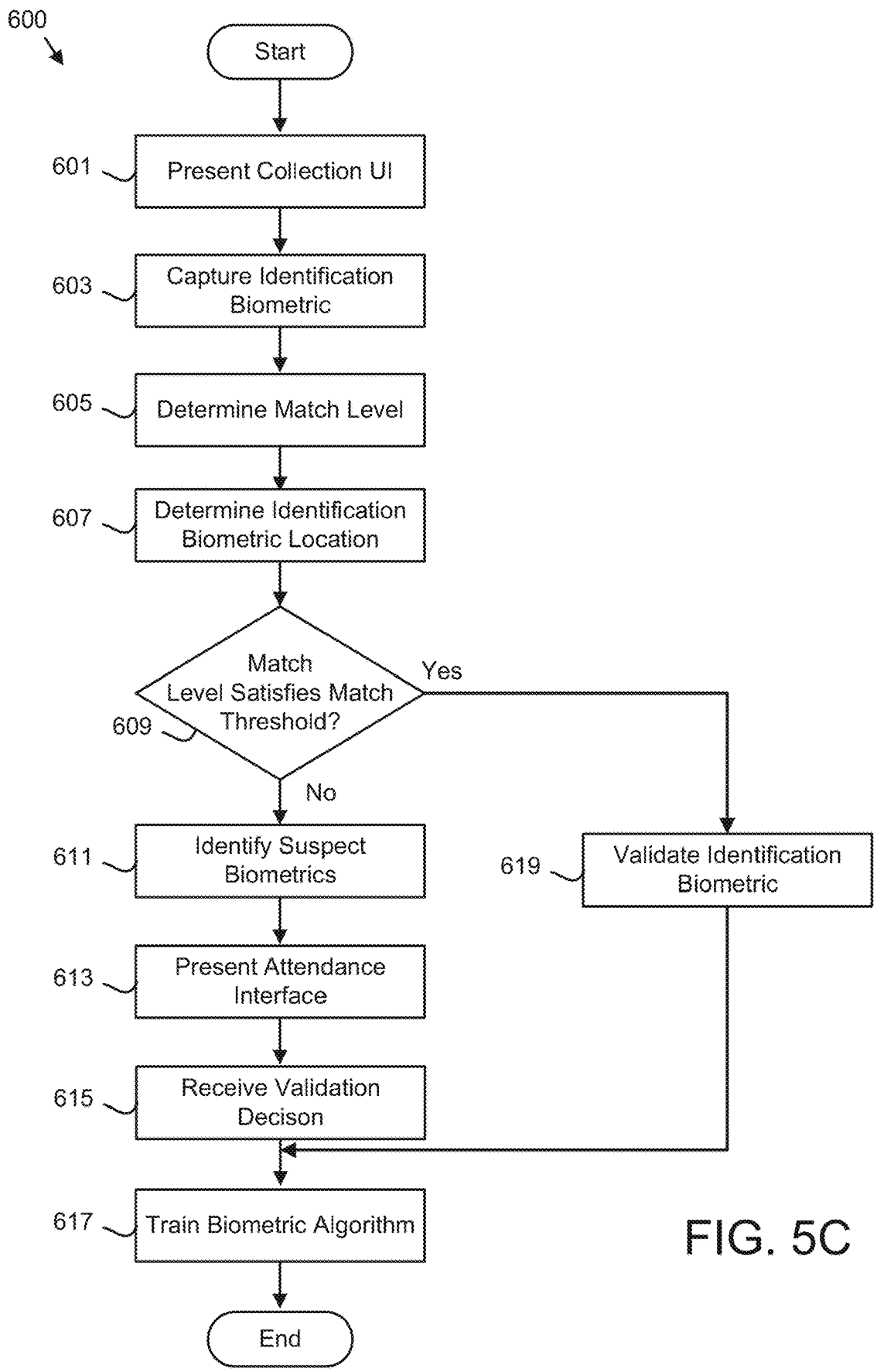
FIG. 5C is a schematic flow chart diagram illustrating one embodiment of a biometric validation method.

FIG. 5C is a schematic flow chart diagram illustrating one embodiment of a biometric validation method 600. The method 600 may validate an identification biometric 301. The method 600 may be performed by the processor 405 and/or neural network 475.

The method 600 starts, and in one embodiment, the processor 405 presents 601 a collection user interface on the punch-in device. The processor 405 further captures 603 the identification biometric 301 with the punch-in device and determines 605 the match level 321 for the identification biometric 301 using the biometric algorithm 333.

In one embodiment, the processor 405 determines 607 the identification biometric location 295. The identification biometric location 295 may be the location of punch-in device 110. In addition, the identification biometric location 295 may be a coordinate such as global positioning system (GPS) coordinate received from the mobile device 120.

The processor 405 may determine 609 if the match level 321 satisfies the match threshold 323. The match level 321 may satisfy the match threshold 323 if the match level 321 exceeds the match threshold 323. If the match level 321 satisfies the match threshold 323, the processor 405 may automatically validate 619 the identification biometric 301.

If the match level 321 does not satisfy the match threshold 323, the processor 405 may identify 611 suspect identification biometrics 301 and/or punch-in/punch-out records. associated with the user. The suspect identification biometrics 301 and/or punch-in/punch-out records may be identified as a function of the punch-in/punch-out times, the corresponding match levels 321, the attendance information, the identification biometric location 295 relative to the geo-fence 293, a time discrepancy, a manual override, a punch-in device, and tangible assets.

In one embodiment, a suspect punch-in/punch-out record is identified 611 if the identification biometric location 295 is outside of the geo-fence 293. In addition, a suspect punch-in/punch-out record may be identified 611 if a time discrepancy is detected. In a certain embodiment, a suspect punch-in/punch-out record is identified 611 if a manual override occurred.

The suspect identification biometrics 301 may have a suspect score that satisfies a suspect threshold. In one embodiment, the suspect score SS is calculated using Equation 1, wherein PD is a time difference between an expected punch-in/punch-out time and an actual punch-in/punch-out time, ML is a difference between a match level 321 and the match threshold 323, DS is a distance between the identification biometric location 295 and the geo-fence 293, TD is the time discrepancy, MO is the existence of a manual override, MD is the use of the mobile device 120 to punch-in/punch-out, TA is the use of tangible assets, and K1-8 are nonzero constants. In one embodiment, ML is the suspect match level.

$$SS = K1*PD + K2*ML + K3*DS + K4*TD + K5*TD + K6*MO + K7*MD + K8*TA \qquad \text{Equation 1}$$

The processor 405 may further present 613 the attendance user interface 200 to the administrator. The attendance user interface 200 may include the suspect identification biometrics 301 along with the most recent identification biometrics 301 and/or most recent suspect identification biometrics 301. The suspect identification biometrics 301 may be highlighted. The attendance user interface 200 allows the administrator to quickly and efficiently review punch-in/punch-out information for the user and make a validation decision. The processor 405 receives 615 the validation decision from the attendance user interface 200.

In one embodiment, the processor 405 trains 617 the biometric algorithm 333 using the identification biometric 301 and the method 600 ends. The processor 405 may recursively train the biometric algorithm 333 with the recent identification biometric 301.

Figure 5D:
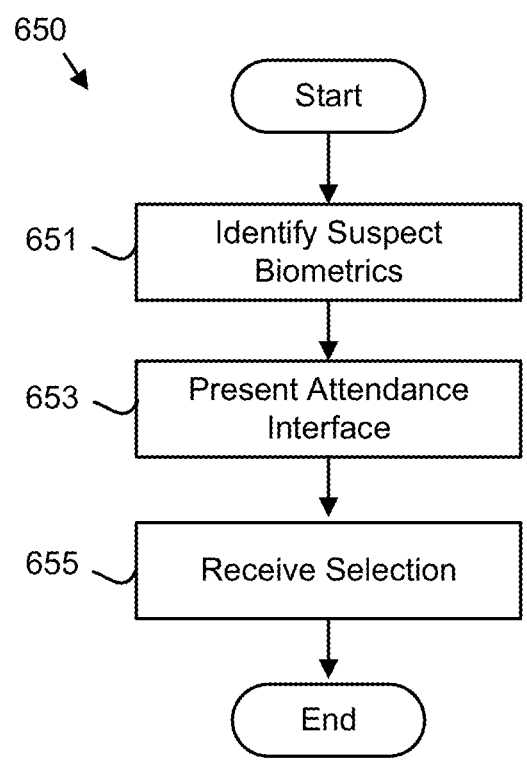
FIG. 5D is a schematic flow chart diagram illustrating one embodiment of a punch-in screening method.

FIG. 5D is a schematic flow chart diagram illustrating one embodiment of a punch-in screening method 650. The method 650 may detect, screen, and/or manage suspect punch-in/punch-out events. The method 650 may be performed by the processor 405.

The method 650 starts, and in one embodiment, the processor 405 identifies 651 suspect identification biometrics 301. The suspect identification biometrics 301 may be identified 651 from suspect match levels. The suspect identification biometrics 301 may also be identified 651 by calculating the suspect score for each punch-in and/or punch-out event. If the suspect score exceeds the suspect threshold, a corresponding record may be identified 651.

The processor may present 653 the attendance user interface 200 to the administrator. Specified records may be presented with the attendance user interface 200. The specified records may be presented 653 in response to a search. In a certain embodiment, the specified records are presented 653 in response to a search based on one or more of the punch-in/punch-out times, the corresponding match levels 321, the attendance information, the identification biometric location 295 relative to the geofence 293, the time discrepancy, the manual override, the punch-in device, and the tangible assets.

In one embodiment, only suspect identification biometrics 301 are presented 653 to the administrator. The suspect identification biometrics 301 may be for a specified user. In an alternate embodiment, a range of records for the user are presented with suspect identification biometrics 301 and/or tags highlighted. For example, the fingerprint tag 241, time discrepancy tag 247, location tag 251, image recognition tag 253, voice print recognition tag 255, and/or retinal recognition tag 259 may be highlighted. As a result, the administrator may efficiently review the most relevant punch-in/punch-out events.

The processor 405 may further receive 655 a selection of a record for further management in the selection column 201 and the method 650 ends. For example, the administrator may manage a selected record by validating and/or invalidating punch-in/punch-out events.

The embodiments support the efficient adjustment of the match threshold 333 by allowing administrator to rapidly review identification biometrics 301 and make appropriate adjustments using the match threshold control 261. The embodiments further support the identification of suspect identification biometrics 301 by allowing the administrator to review identification biometrics 301 including suspect identification biometrics 301 using the attendance user interface 200. As a result, the management of the biometric punch-in system 100 is enhanced.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:

capturing, by use of a processor, training biometrics for a plurality of users;

training a biometric algorithm with the training biometrics;

presenting a threshold user interface to an administrator that compares a punch-in match level and a punch-out match level for one or more identification biometrics that do not satisfy a match threshold for the plurality of users and a match threshold control for adjusting the match threshold;

adjusting the match threshold in response to the match threshold control;

capturing an identification biometric in a punch-in operation/punch-out operation for a first user of the plurality of users;

determining a match level for the identification biometric based on the biometric algorithm;

in response to the match level not satisfying the match threshold during the punch-in operation/punch-out operation, presenting an attendance user interface comprising punch-in/punch-out times, corresponding identification biometrics and match levels, and attendance information for the first user, wherein suspect identification biometrics are highlighted; and receiving a validation or invalidation of the punch-in operation/punch-out operation from the administrator.

2. The method of claim 1, the method further comprising determining an identification biometric location.

3. The method of claim 2, wherein the suspect identification biometrics are identified as a function of one or more of the punch-in/punch-out times, the corresponding match levels, the attendance information, the identification biometric location relative to a geo-fence, a time discrepancy, a manual override, a punch-in device, and tangible assets.

4. The method of claim 3, wherein the punch-in/punch-out times, the corresponding match levels, the attendance information, the identification biometric location relative to the geofence, the time discrepancy, the manual override, the punch-in device, and the tangible assets are searchable.

5. The method of claim 1, the method further comprising automatically validating the identification biometric if the match level satisfies the match threshold.

6. The method of claim 1, wherein the biometrics are a biometric type selected from the group consisting of an image, a voice print, a retina scan, and a fingerprint.

7. The method of claim 1, the method further comprising recursively training the biometric algorithm with the suspect identification biometrics.

8. The method of claim 1, wherein the training biometrics are filtered by one or more of the punch-in/punch-out times, the corresponding match levels, the attendance information, an identification biometric location relative to a geofence, a time discrepancy, a manual override, a punch-in device, and tangible assets.

9. The method of claim 1, wherein the biometric algorithm is selected from the group consisting of a statistical algorithm, a recursive neural network, a convolutional neural network, and a long short term memory (LSTM) network.

10. An apparatus comprising:
a processor;
a memory storing code executable by the processor to perform:
capturing training biometrics for a plurality of users;
training a biometric algorithm with the training biometrics;
presenting a threshold user interface to an administrator that compares a punch-in match level and a punch-out match level for one or more identification biometrics that do not satisfy a match threshold for the plurality of users and a match threshold control for adjusting the match threshold;
adjusting the match threshold in response to the match threshold control;
capturing an identification biometric in a punch-in operation/punch-out operation for a first user of the plurality of users;
determining a match level for the identification biometric based on the biometric algorithm; and
in response to the match level not satisfying the match threshold during the punch-in operation/punch-out operation, presenting an attendance user interface comprising punch-in/punch-out times, corresponding identification biometrics and match levels, and attendance information for the first user, wherein suspect identification biometrics are highlighted, and receiving a validation or invalidation of the punch-in operation/punch-out operation from the administrator.

11. The apparatus of claim 10, the processor further determining an identification biometric location.

12. The apparatus of claim 11, wherein the suspect identification biometrics are identified as a function of one or more of the punch-in/punch-out times, the corresponding match levels, the attendance information, the identification biometric location relative to a geo-fence, a time discrepancy, a manual override, a punch-in device, and tangible assets.

13. The apparatus of claim 12, wherein the punch-in/punch-out times, the corresponding match levels, the attendance information, the identification biometric location relative to the geofence, the time discrepancy, the manual override, the punch-in device, and the tangible assets are searchable.

14. The apparatus of claim 10, the processor further automatically validating the identification biometric if the match level satisfies the match threshold.

15. The apparatus of claim 10, wherein the biometrics are a biometric type selected from the group consisting of an image, a voice print, a retina scan, and a fingerprint.

16. The apparatus of claim 10, the method further comprising recursively training the biometric algorithm with the suspect identification biometrics.

17. The apparatus of claim 10, wherein the training biometrics are filtered by one or more of the punch-in/punch-out times, the corresponding match levels, the attendance information, an identification biometric location relative to a geofence, a time discrepancy, a manual override, a punch-in device, and tangible assets.

18. The apparatus of claim 10, wherein the biometric algorithm is selected from the group consisting of a statistical algorithm, a recursive neural network, a convolutional neural network, and a long short term memory (LSTM) network.

19. A program product comprising a non-transitory computer readable storage medium storing code executable by a processor to perform:
capturing training biometrics for a plurality of users;
training a biometric algorithm with the training biometrics;
presenting a threshold user interface to an administrator that compares a punch-in match level and a punch-out match level for one or more identification biometrics that do not satisfy a match threshold for the plurality of users and a match threshold control for adjusting the match threshold;
adjusting the match threshold in response to the match threshold control;
capturing an identification biometric in a punch-in operation/punch-out operation for a first user of the plurality of users;
determining a match level for the identification biometric based on the biometric algorithm;
in response to the match level not satisfying the match threshold during the punch-in operation/punch-out operation, presenting an attendance user interface comprising punch-in/punch-out times, corresponding identification biometrics and match levels, and attendance information for the first user, wherein suspect identification biometrics are highlighted; and receiving a validation or invalidation of the punch-in operation/punch-out operation from the administrator.

20. The program product of claim 19, wherein the suspect identification biometrics are identified as a function of one or more of the punch-in/punch-out times, the corresponding match levels, the attendance information, the identification biometric location relative to a geo-fence, a time discrepancy, a manual override, a punch-in device, and tangible assets.

* * * * *